(12) United States Patent
Pearl

(10) Patent No.: US 6,398,447 B1
(45) Date of Patent: *Jun. 4, 2002

(54) UNITARY EYE BOLT

(75) Inventor: Fred R. Pearl, Westminster, CA (US)

(73) Assignee: Actek Manufacturing & Engineering Co., Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/346,123

(22) Filed: Jul. 1, 1999

Related U.S. Application Data

(60) Provisional application No. 60/091,410, filed on Jul. 1, 1998.

(51) Int. Cl.$^7$ ................................................ A47F 13/01
(52) U.S. Cl. ..................... 403/164; 291/1.1; 248/499; 411/400
(58) Field of Search ................... 294/1.1, 89, 82.1; 403/78, 79, 164, 165, 157, 147; 411/435, 409, 400, 366.1; 410/101; 248/500, 499

(56) References Cited

U.S. PATENT DOCUMENTS

| | | | | |
|---|---|---|---|---|
| 638,564 A | * | 12/1899 | Davies | 403/164 |
| 694,345 A | * | 3/1902 | Bennett | 411/65 X |
| 718,582 A | * | 1/1903 | Rancourt | 294/89 |
| 812,214 A | * | 2/1906 | Law et al. | 294/158 X |
| 1,006,040 A | * | 10/1911 | Alsberg | 403/79 X |
| 1,201,295 A | * | 10/1916 | Hendee | 411/400 X |
| 1,352,665 A | * | 9/1920 | Healy | 294/89 |
| 2,099,116 A | * | 11/1937 | Kalmback | 294/103.1 X |
| 2,140,014 A | * | 12/1938 | Iasillo | 403/47 X |
| 2,719,747 A | * | 10/1955 | Layne | 294/89 |
| 2,778,664 A | * | 1/1957 | Herbenar | 403/164 |
| 3,297,293 A | * | 1/1967 | Andrews et al. | 248/499 X |
| 3,339,872 A | * | 9/1967 | Eggleton, Jr. | 294/82.1 X |
| 3,491,646 A | * | 1/1970 | Tinnerman | 411/436 X |
| 3,739,683 A | * | 6/1973 | Bishop | 411/34 |
| 3,868,732 A | * | 3/1975 | Engelhart | 411/400 X |
| 3,905,633 A | * | 9/1975 | Larson | 294/1.1 |
| RE31,131 E | * | 1/1983 | Torbet et al. | 294/89 |
| 4,557,513 A | * | 12/1985 | Ferrieri | 294/1.1 |
| 4,592,686 A | * | 6/1986 | Andrews | 410/101 X |
| 4,615,554 A | * | 10/1986 | Schilla et al. | 294/89 |
| 4,740,023 A | * | 4/1988 | Miller | 294/1.1 |
| 4,824,304 A | * | 4/1989 | Shibayama et al. | 411/171 X |
| 4,921,384 A | * | 5/1990 | Nordyke | 411/361 X |
| 4,940,271 A | * | 7/1990 | Steffes | 294/1.1 |
| 4,958,796 A | * | 9/1990 | Bernosky | 411/400 X |
| 5,183,360 A | * | 2/1993 | Freeman | 411/400 X |
| 5,441,417 A | * | 8/1995 | Ladouceur et al. | 439/84 X |
| 5,549,234 A | * | 8/1996 | Hong | 411/400 X |
| 5,947,671 A | * | 9/1999 | Kanaan et al. | 411/435 |
| 5,992,910 A | * | 11/1999 | Kwon | 294/1.1 |
| 6,161,883 A | * | 12/2000 | Pearl | 294/1.1 |
| 6,161,884 A | * | 12/2000 | Pearl | 294/1.1 |

FOREIGN PATENT DOCUMENTS

| | | | | |
|---|---|---|---|---|
| DE | 2718562 | * | 11/1978 | 411/435 |
| DE | 2758992 | * | 7/1979 | |
| FR | 566955 | * | 2/1924 | |
| GB | 1151127 | * | 5/1969 | 350/85 X |
| JP | 405330782 | * | 12/1993 | 294/89 |

* cited by examiner

*Primary Examiner*—Harry C. Kim
(74) *Attorney, Agent, or Firm*—Stout, Uxa, Buyan & Mullins LLP

(57) ABSTRACT

A unitary eye bolt comprising a large-diameter skirt member for dissipating lateral forces, applied onto the unitary eye bolt, is disclosed. The large-diameter skirt member is threaded onto a stud, and can be locked onto the stud with a nut. Once the large-diameter skirt member is locked into place, one or more arms of the large-diameter skirt member can be used to apply rotational forces onto the unitary eye bolt to thereby secure or remove the stud of the unitary eye bolt from the trench plate. Each arm of the large-diameter skirt member can be impacted with a hammer, for example, to apply substantial rotational forces onto the unitary eye bolt for tightening or removal thereof. A unique double-threaded stud is used to accommodate the large-diameter skirt member. The double-threaded stud comprises a first thread on one end for being threaded into a trench plate, and a second thread on the other end for accommodating both the large-diameter skirt member and a securing nut.

12 Claims, 3 Drawing Sheets

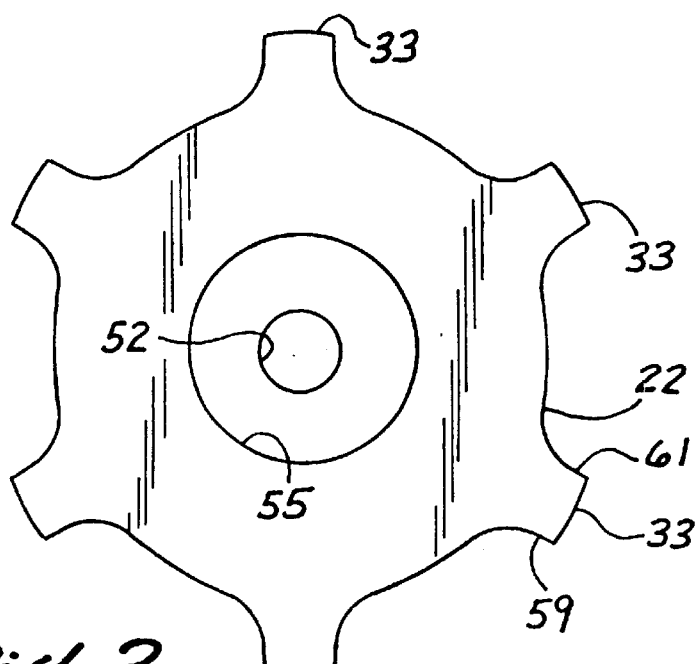
Fig. 3
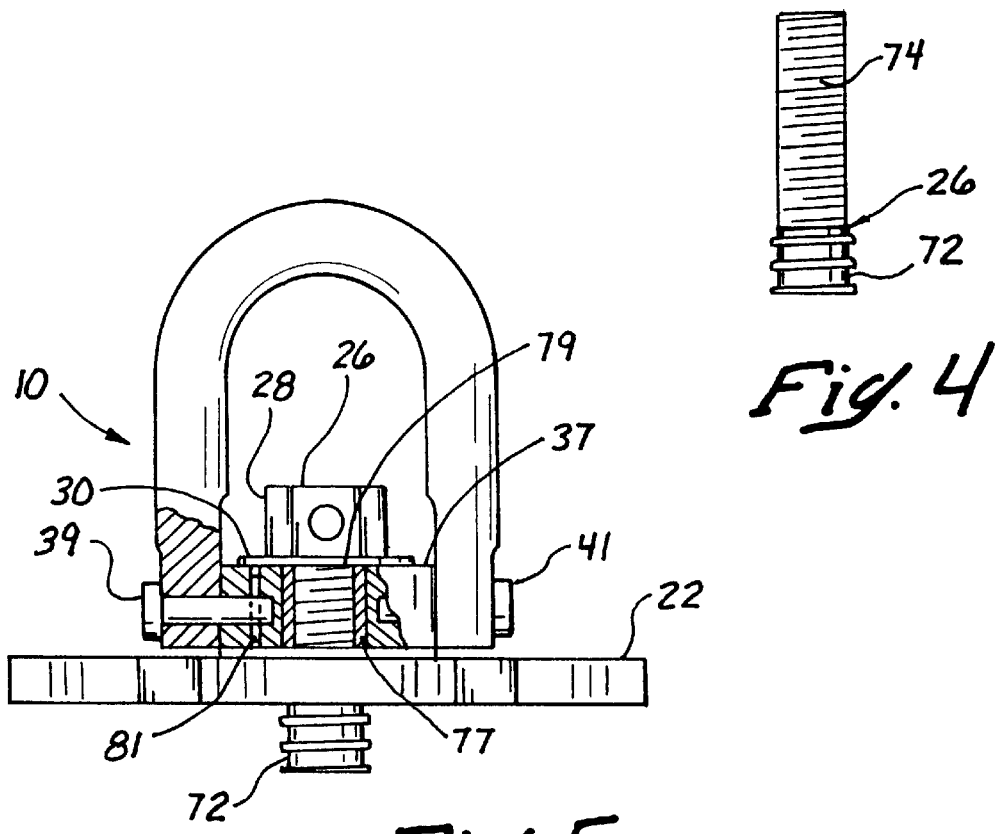
Fig. 4
Fig. 5

UNITARY EYE BOLT

This application claims the benefit of U.S. Provisional Application Serial No. 60/091,410, filed Jul. 1, 1998 and entitled UNITARY EYE BOLT the contents of which are expressly incorporated herein by reference.

BACKGROUND OF THE INVENTION

1. Field of the Invention

The present invention relates generally to fastening devices and, more particularly, to a eye bolts for being removably connected to trench plates.

2. Description of Related Art

Various swivel hoist rings have been implemented in the prior art. U.S. Pat. No. 3,297,293 to Andrews et al. discloses a fastening device comprising an eye member which is pivotally and rotationally mounted onto a base. The fastening device, however, comprises a relatively small-diameter retaining ring for contacting the base. Horizontal forces exerted onto the fastening device must thus be absorbed by a stud secured into the base and the relatively small-diameter retaining ring. Additionally, removal of the fastening device from the base can only be achieved by using a tool to grip the head of the stud, which is also configured to have a relatively small diameter. If the head of the stud is damaged, or if a wrench is not available for fitting onto the head of the stud, then the fastening device cannot easily be removed.

Trench plates generally comprise rectangular steel members weighing between 5,000 and 9,000 pounds. A typical trench plate may be 8 feet wide by 12 feet long and 2 inches thick. A threaded nut is secured in a middle area of the trench plate, and is adapted for receiving an eye bolt, according to the prior art. The eye bolt comprises an opening, for receiving a cable or other fastening member. Once the eye bolt is threaded into the nut of the trench plate, and is fastened to a cable, for example, the trench plate can be removed. Eye bolts, however, are incapable of swiveling and maintaining structural integrity under off-axis horizontal loads.

SUMMARY OF THE INVENTION

The trench plate connector of the present invention comprises a large-diameter skirt member for dissipating lateral forces applied onto the trench plate connector. The large-diameter skirt member is threaded onto a stud, and can be locked onto the stud with a nut. Once the large-diameter skirt member is locked into place, one or more arms of the large-diameter skirt member can be used to apply rotational forces onto the trench plate connector to thereby secure or remove the stud of the trench plate connector from the trench plate. Each arm of the large-diameter skirt member can be impacted with a hammer, for example, to apply substantial rotational forces onto the trench plate connector for tightening or removal thereof A unique double-threaded stud is used to accommodate the large-diameter skirt member of the present invention. The double-threaded stud comprises a first thread on one end for being threaded into a trench plate, and a second thread on the other end for accommodating both the large-diameter skirt member and a securing nut.

The present invention, together with additional features and advantages thereof, may best be understood by reference to the following description taken in connection with the accompanying illustrative drawings.

BRIEF DESCRIPTION OF THE DRAWINGS

FIG. 3 illustrates a bottom view of a large-diameter skirt member in accordance with the present invention;

FIG. 4 illustrates a side-elevational view of a double-threaded stud in accordance with the present invention;

FIG. 5 illustrates a partial cross-sectional view of a trench plate connector in accordance with the present invention.

DETAILED DESCRIPTION OF THE PRESENTLY PREFERRED EMBODIMENT

Figure 1:
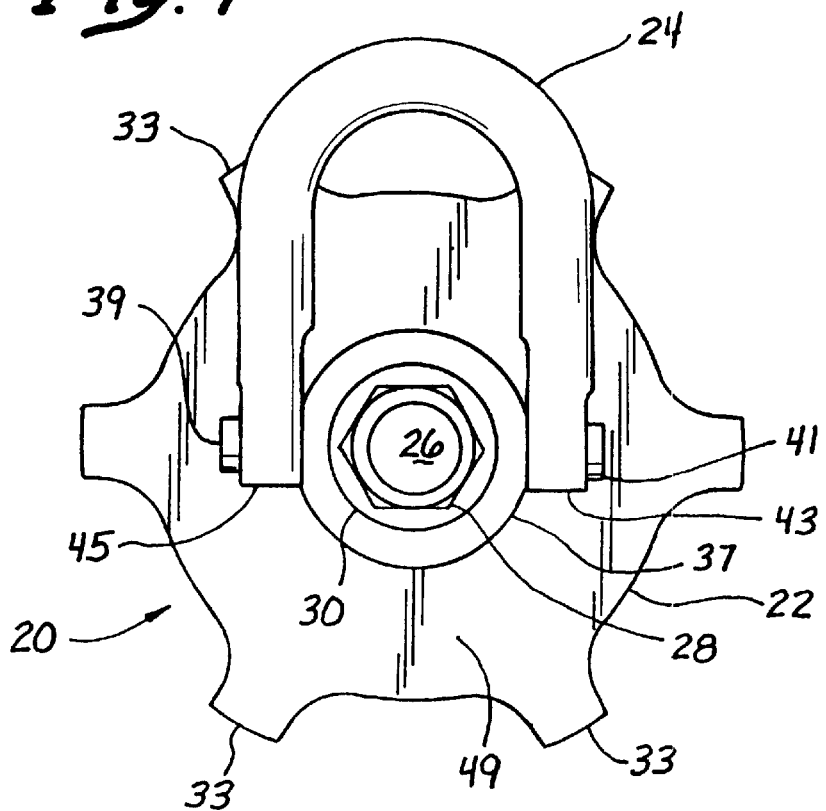
FIG. 1 illustrates a top-planar view of a trench plate connector in accordance with the present invention.

Referring more particularly to the drawings, FIG. 1 illustrates a trench plate connector 20 comprising a large-diameter skirt member 22, an eye member 24, a double-threaded stud 26, a nut 28, and a circular plate 30. The large-diameter skirt member 22 comprises a number of arms 33 and a threaded aperture 52 (FIG. 3) for accommodating the double-threaded stud 26. The large-diameter skirt member 22 is preferably manufactured to have a diameter of approximately nine inches, and each of the arms 33 is preferably manufactured to have a width at a distal end of approximately one inch.

The eye member 24 is secured to a load ring 37 via two pivot pins 39, 41. Each of the two pivot pins 39, 41 passes through an aperture of the eye member 24 and, subsequently, through a corresponding aperture in the load ring 37. (See FIG. 5.) The eye member 24 is shown in FIG. 1 in an off-axis position, relative to an axis of the stud 26. In the configuration of FIG. 1, the eye member 24 is pivoted about an axis formed by the pivot pins 39, 41 in a direction toward the top of the page. In addition to being pivotable about an axis formed by the pivot pins 39, 41, the eye member 24 is rotatable about an axis of the double-threaded stud 26.

Figure 2:
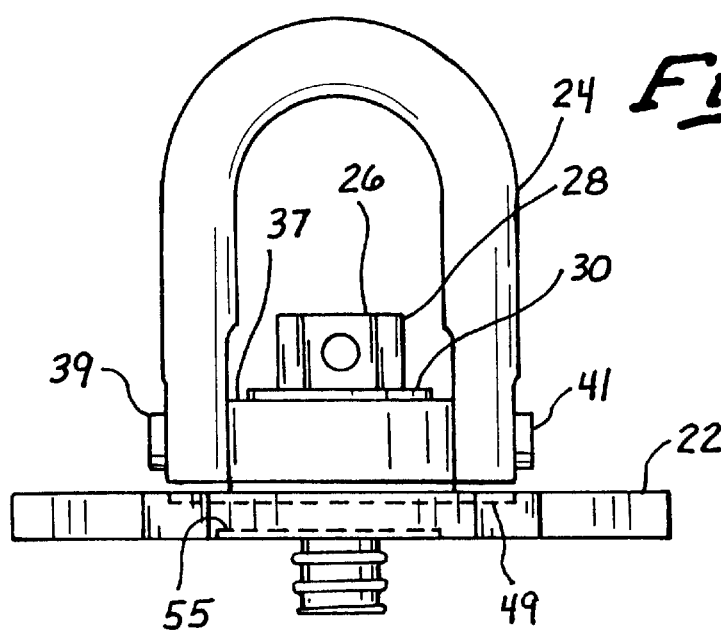
FIG. 2 illustrates a side-elevational view of a trench plate connector in accordance with the present invention.

FIG. 2 illustrates a side-elevational view of the trench plate connector 20 of the present invention. As can be seen from the phantom line 49, the large-diameter skirt member 22 comprises a recessed area 49. The recessed area 49 provides clearance for the ends 43, 45 of the eye member 24, as the eye member 24 is rotated about the axis of the double-threaded stud 26 in a pivoted position, such as shown in FIG. 1. A clearance between the ends 43, 45 of the eye member 24 and the recessed area 49 is greater when the eye member 24 is in a non-pivoted orientation, as illustrated in FIG. 2. As shown in FIG. 2, a thickness of the large-diameter skirt member 22 is preferably ⅝ inch, and a thickness the eye member 24 is preferably one inch. An exterior width of the eye member 24 is preferably 4.8 inches, and an interior width of the eye member 24 is preferably 2.8 inches. A height of the eye member 24 is preferably 7.5 inches, and a height of the eye member and the large-diameter skirt member together is approximately 6.96 inches. The components shown in FIG. 2 preferably comprise 4140 aircraft quality, heat-treated steel, with a finish comprising oil black oxide. The trench plate connector preferably comprises a safety factor of 5 to 1, and a rated load of approximately 10,000 pounds.

FIG. 3 illustrates a bottom view of the large-diameter skirt member 22. The large-diameter skirt member 22 comprises a threaded aperture 52 for accommodating the double-threaded stud 26. A second recessed area 55 is formed in the bottom of the large-diameter skirt member 22. The second recessed area 55 is adapted to accommodate a portion of a nut of a trench plate, which may protrude slightly from a surface of the trench plate. The second recessed area 55 helps to ensure that the entire bottom surface of the large-diameter skirt member 22, with possibly the exception of the second recessed area 55, contacts the surface of the trench plate. When the bottom surface of the large-diameter skirt member 22 fits flush against the upper surface of a trench plate, horizontal forces exerted on the eye member 24 and transferred to the double-threaded stud 26, are subsequently transferred from the bottom surface of the large-diameter skirt member 22 onto the upper surface of the trench plate. All of the forces are therefore not concentrated only on the stud 26. Horizontal forces are defined herein as forces which are off-axis to the axis of the double-threaded stud 26.

Another aspect of the present invention is the configuration of the arms 33 of the large-diameter skirt member 22. Each arm 33 comprises two surfaces 59, 61, which are angled approximately radially outwardly from a center of the large-diameter skirt member 22. Each of the surfaces 59, 61 is adapted for receiving a rotational force for either threading the double-threaded stud 26 into a threaded nut of the trench plate or unthreading the double-threaded stud 26 therefrom. A hammer, for example, may be applied onto the surface 61 in order to apply rotational forces thereto. In an alternative embodiment, the arms 33 may be extended radially outwardly in order to accommodate rectangular cross-sectioned pipes, for example.

FIG. 4 illustrates a side-elevational view of the double-threaded stud 26. The double-threaded stud 26 comprises a first portion of threads 72, which are preferably adapted for being threaded into an aperture of the trench plate. The double-threaded stud 26 further comprises a second portion of threads 74, which are adapted for being threaded into both the aperture 52 of the large-diameter skirt member 22 and the nut 28. The large distance of the arms 33 from a center portion of the large-diameter skirt member 22 facilitates the application of high-torque forces onto the large-diameter skirt member 22 and, subsequently, onto the double-threaded stud 26.

FIG. 5 illustrates a partial cross-sectional view of the trench plate connector 10 of the present invention. Mounted on the double-threaded stud 26 is a bushing 77, the bushing 77 having an axial bore 79 for receiving the double-threaded stud 26. The bushing 77 is rotatable about the double-threaded stud 26, and the load ring 37 is rotatable about both the bushing 77 and the double-threaded stud 26. The load ring 37 frictionally engages and is seated on a raised portion of the large-diameter skirt member 22. The load ring 37 can be freely rotated in either direction for a fall 360 degrees about an axis of the double-threaded stud 26. The circular plate 30 is fitted over the double-threaded stud 26 and is located between the nut 28 on one side and the surfaces of the load ring 37 and the bushing 77 on the other side.

Each of the pivot pins 39, 41 is attached to the load ring 37 by a corresponding lock pin 81, for example, fitted into a vertical bore formed through the load ring 37 and extending through a compatible and aligned hole formed in the end of the pin 39, for example. The ends of the vertical bore containing the lock pin 81, for example, are closed by the circular plate 30 and the surface of the large-diameter skirt member 22 so as to hold the lock pin 81, for example, in place and preclude unintentional loss or disengagement.

Figure 6:
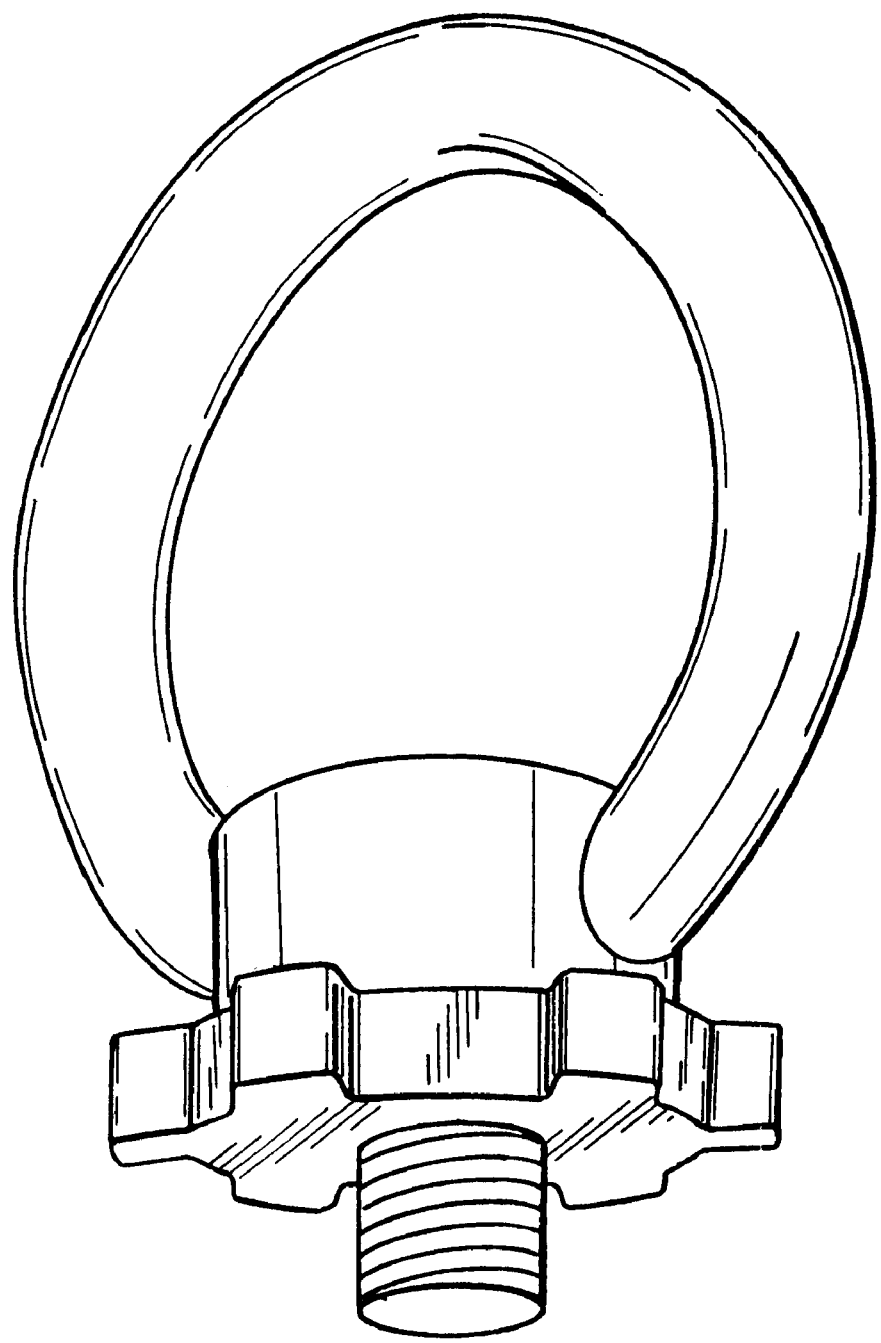
FIG. 6 is a perspective view of the unitary eye bolt in accordance with the presently preferred embodiment.

Turning now to FIG. 6, an eye bolt comprises a bolt and a ring permanently and rigidly secured to the bolt. The ring neither rotates nor pivots. The bolt comprises a head, which may comprise a load ring and/or other components for permanently holding the ring, and which is secured to an end of the bolt. A skirt member is permanently connected to the head and the belt in the illustrated embodiment.

The structure of the skirt member and advantages associated therewith are similar (except for the relative dimensions) to the structure disclosed in co-pending U.S. application Ser. No. 09/108,573, which is commonly assigned and the contents of which are expressly incorporated herein by reference.

In the illustrated embodiment, the relative diameter of the skirt member is relatively small, compared to the relative size thereof disclosed in the above-referenced co-pending provisional application. In the illustrated embodiment, the arms of the skirt member are shorter, relative to the diameter of the skirt member, as compared to the relative sizes disclosed in the above-referenced co-pending patent, application.

In the illustrated embodiment, the skirt member is integrally formed with (or permanently attached to) both the head and the ring by means such as welding.

As a result of the eye bolt of the present invention comprising no moving parts, the eye bolt is very rugged and sturdy, with rated loads from 10,000 lbs to 50,000 lbs depending on size. The material of the eye bolt of the present invention is heat treated, and the threads can be manufactured in inch, metric, or coil.

In a modified embodiment, the bolt comprises a double-threaded bolt and the skirt member is welded neither to the head nor the ring, such structure corresponding generally to that disclosed in the above-referenced co-pending patent application. In this embodiment, the permanent attachment of the head to the double-threaded shaft permanently secures the skirt to the assembly. In a variation of this embodiment, the ring is not welded to the head and is able to pivot. In another variation, the head of the bolt comprises a nut, which may or may not be permanently secured to the bolt.

Although the above embodiments illustrate a particular configuration of a machined hoist ring, for example, the present invention is applicable to many other types of fastening devices, such as eye bolts and hoist rings, so long as the fastening device has a threaded bolt for being secured into an object to be lifted. Although an exemplary embodiment of the invention has been shown and described, many other changes, modifications and substitutions, in addition to those set forth in the above paragraphs, may be made by one having ordinary skill in the art without necessarily departing from the spirit and scope of this invention.

What is claimed is:

1. A unitary eye bolt, comprising:
   a stud having a head at a proximal end, a distal end, and a rotational axis extending therebetween;
   an eye member permanently and rigidly affixed to the head; and
   a skirt member permanently and rigidly affixed to the stud, the skirt member having a generally circular perimeter and comprising at least one arm extending radially away from the circular perimeter, the at least one arm radially protruding from the circular perimeter and comprising an impact-tightening surface and an impact-loosening surface, both of which are substantially normal to the circular perimeter, the skirt member having a perimeter shape excluding a perimeter shape of a hex-nut.

2. The unitary eye bolt as recited in claim 1, the at least one arm comprising a plurality of arms.

3. The unitary eye bolt as recited in claim 2, the plurality of arms comprising at least three arms.

4. The unitary eye bolt as recited in claim 1, and further comprising a load ring disposed around a portion of the stud between the proximal end and the distal end, the load ring being permanently affixed to the stud.

5. A unitary eye bolt, comprising:

a stud having a head at a proximal end, a distal end, and a rotational axis extending therebetween;

an eye member permanently and rigidly affixed to the head; and a large diameter skirt member coupled to the stud, the large diameter skirt member comprising a large diameter relative to a width of the head measured in a direction perpendicular to the rotational axis, the large diameter skirt member having a perimeter shape excluding a circle shape and further excluding a hex-nut shape, the large diameter skirt member comprising at least one protruding arm having a first contact surface and a second contact surface, the first contact surface extending radially away from the rotational axis for facilitating impact-tightening by a tool and the second contact surface being substantially parallel to the first contact surface for facilitating impact-loosening by a tool.

6. The unitary eye bolt as recited in claim 5, the at least one protruding arm comprising a plurality of arms.

7. The unitary eye bolt as recited in claim 5, the at least one protruding arm comprising at least three protruding arms.

8. The unitary eye bolt as recited in claim 7, each of the at least three protruding arms having a contacting surface which extends substantially radially from the rotational axis.

9. The unitary eye bolt as recited in claim 5, and further comprising a load ring disposed around a portion of the stud between the proximal end and the distal end, the load ring being permanently affixed to the stud.

10. The unitary eye bolt as recited in claim 5, the large diameter skirt member being permanently and rigidly affixed to the stud.

11. A unitary eye bolt, comprising:

a stud having a head at a proximal end, a distal end, and a rotational axis extending therebetween;

an eye member permanently and rigidly affixed to the head;

a skirt member permanently and rigidly affixed to the stud, the skirt member comprising at least one arm and having a perimeter shape excluding a perimeter shape of a hex-nut; and a load ring disposed around a portion of the stud between the proximal end and the distal end, the load ring being permanently affixed to the stud.

12. An unitary eye bolt, comprising:

a stud having a head at a proximal end, a distal end, and a rotational axis extending therebetween;

an eye member permanently and rigidly affixed to the head;

a large diameter skirt member coupled to the stud, the large diameter skirt member comprising a large diameter relative to a width of the head measured in a direction perpendicular to the rotational axis, the large diameter skirt member having a perimeter shape excluding a circle shape and further excluding a hex-nut shape; and a load ring disposed around a portion of the stud between the proximal end and the distal end, the load ring being permanently affixed to the stud.

* * * * *